US012651755B2

(12) United States Patent
Moore

(10) Patent No.: US 12,651,755 B2
(45) Date of Patent: Jun. 9, 2026

(54) BATTERY MANAGEMENT SYSTEMS AND METHODS

(71) Applicant: The Boeing Company, Arlington, VA (US)

(72) Inventor: Michael E. Moore, O'Fallon, MO (US)

(73) Assignee: The Boeing Company, Arlington, VA (US)

( * ) Notice: Subject to any disclaimer, the term of this patent is extended or adjusted under 35 U.S.C. 154(b) by 537 days.

(21) Appl. No.: 18/346,102

(22) Filed: Jun. 30, 2023

(65) Prior Publication Data

US 2025/0006952 A1      Jan. 2, 2025

(51) Int. Cl.
| | |
|---|---|
| *H01M 6/36* | (2006.01) |
| *B60L 3/04* | (2006.01) |
| *B60L 58/12* | (2019.01) |
| *B60L 58/18* | (2019.01) |
| *H01M 6/42* | (2006.01) |
| *H01M 6/50* | (2006.01) |

(52) U.S. Cl.
CPC ........... *H01M 6/5088* (2013.01); *H01M 6/36* (2013.01); *H01M 6/42* (2013.01); *H01M 6/5011* (2013.01); *B60L 3/04* (2013.01); *B60L 58/12* (2019.02); *B60L 58/18* (2019.02); *B60L 2200/10* (2013.01)

(58) Field of Classification Search
None
See application file for complete search history.

*Primary Examiner* — Carlos Barcena
(74) *Attorney, Agent, or Firm* — Alleman Hall LLP

(57) ABSTRACT

A battery management system includes thermal batteries, sensors, a clock, a processor, and memory storing a data structure, and is configured to receive energy parameters and time data, calculate a rate of energy usage of the thermal batteries based on the received data, and execute battery commands to activate or disable selected thermal batteries. Energy usage data can be stored as individual data points over time, and battery commands can be received from an external computer. The system determines when to activate a second battery based on a predetermined threshold of estimated electrical energy of a first thermal battery. A battery management method includes receiving signals for voltage, current, temperature, and time duration, estimating electrical energy based on these parameters, and activating a second battery when the estimated energy falls below a predetermined threshold.

20 Claims, 7 Drawing Sheets

136

126

138

118

102

WIRELESS NETWORK 101

HOST 132

100

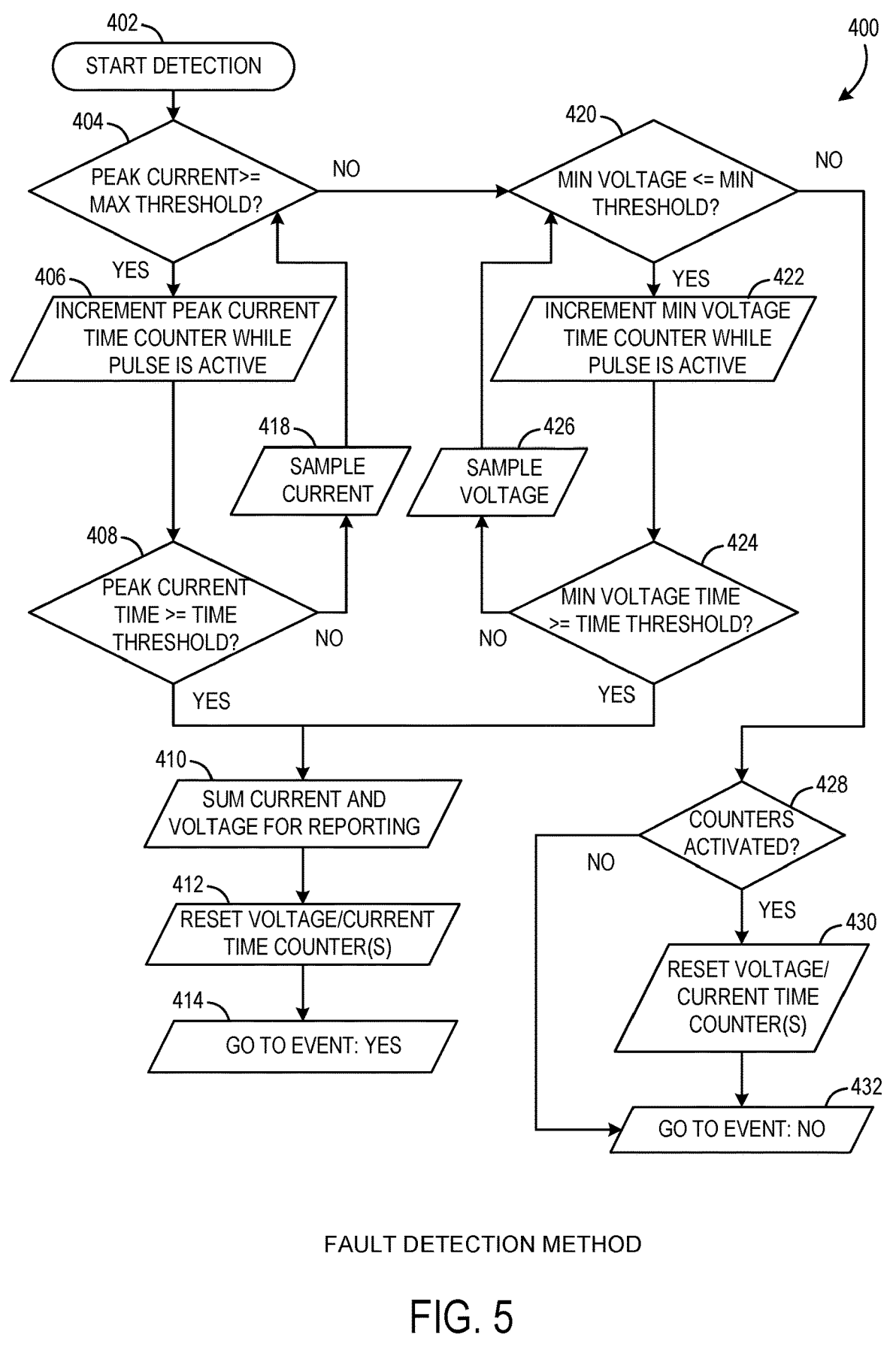

400

402 START DETECTION

404 PEAK CURRENT >= MAX THRESHOLD?

NO

406 YES INCREMENT PEAK CURRENT TIME COUNTER WHILE PULSE IS ACTIVE

418 SAMPLE CURRENT

408 PEAK CURRENT TIME >= TIME THRESHOLD?

NO

YES

410 SUM CURRENT AND VOLTAGE FOR REPORTING

412 RESET VOLTAGE/CURRENT TIME COUNTER(S)

414 GO TO EVENT: YES

420 MIN VOLTAGE <= MIN THRESHOLD?

NO

422 YES INCREMENT MIN VOLTAGE TIME COUNTER WHILE PULSE IS ACTIVE

426 SAMPLE VOLTAGE

424 MIN VOLTAGE TIME >= TIME THRESHOLD?

NO

YES

428 COUNTERS ACTIVATED?

NO

YES

430 RESET VOLTAGE/ CURRENT TIME COUNTER(S)

432 GO TO EVENT: NO

FAULT DETECTION METHOD

FIG. 5

FAULT DETECTION METHOD

1

BATTERY MANAGEMENT SYSTEMS AND METHODS

GOVERNMENT LICENSE RIGHTS

This invention was made with Government support under (W15QKN-18-9-1008 DOTC-19-01-INIT0543) awarded by the Department of Defense-DOD. The Government has certain rights in this invention.

FIELD

The present invention relates generally to energy management, and more particularly to battery management systems and methods for managing energy usage in thermal batteries through monitoring and control.

BACKGROUND

Energy management systems are used in modern weapons systems to provide reliable and long-lasting power sources that operate effectively. Many weapons have a storage life of twenty or more years, which is a significant challenge for any battery technology. Thermal batteries are a type of battery that creates energy based on a chemical reaction that produces heat. The chemicals used to create the chemical reaction are relatively stable in their inert state, providing thermal batteries with a relatively long useful life. Due to this relatively long lifespan, thermal batteries are incorporated into many modern weapons to power electrical systems, such as weapons avionics systems.

Thermal batteries can be activated electrically or inertially. Inertially activated thermal batteries can be activated via a mechanical plunger or striker which, in turn, starts the batteries' heat-generating chemical reaction, which in turn produces usable electrical energy. An inertially activated battery is activated by a change in inertia due to a shock event, such as that which may occur at the start of a mission. Some examples of inertial events used to activate such batteries include a launched projectile leaving a gun barrel on a tank, or a launched torpedo leaving its container. On the other hand, an electrically activated battery can be ignited with an electrical pulse that causes the thermal reaction to occur and produce electrical energy. Examples of electrical pulses that can be used to activate such batteries include ignition events in an aircraft, ground launchers, submersibles, or other platform.

The lifespan of thermal batteries depends on how quickly the thermal batteries cool off after they start being used. As a battery drops in temperature during use, the internal resistance within the battery increases, and the amount of energy that can be extracted from the battery gradually decreases to a point where the battery can no longer sufficiently power a load. Conventionally, when designing a thermal battery powered weapon, the minimum lifespan of a thermal battery is specified by accounting for the worst-case adverse conditions that the thermal battery can theoretically experience, such as cold temperatures and high winds that may lower the operating temperature of the thermal battery. However, conventional thermal battery systems lack mechanisms to quantitatively evaluate the amount of electrical energy consumed versus the amount of electrical energy remaining in each thermal battery once the thermal battery is activated. This deficiency may compromise the ability of the thermal battery systems to meet energy requirements in various applications, including weapons avionics systems. For example, in thermal battery powered weapons which depend on the timely activation of subsequent thermal batteries, the absence of reliable mechanisms to accurately determine the ongoing energy utilization of the thermal batteries may potentially affect the reliability and performance of weapons operations.

SUMMARY

In view of the above, a battery system is provided, comprising one or a plurality of thermal batteries, one or a plurality of sensors configured to determine energy parameters at the one or the plurality of thermal batteries, a clock configured to report a time at which the energy parameters are determined, a processor, and a memory storing executable instructions that, in response to execution by the processor, cause the processor to receive the energy parameters from the one or the plurality of sensors, receive the time from the clock, calculate a rate of energy usage of the one or the plurality of thermal batteries based on the energy parameters and the time. Responsive to calculating the rate of energy usage, battery commands are executed to activate or disable a selected thermal battery or a selected plurality of thermal batteries of the one or the plurality of thermal batteries based at least in part on the calculated rate of energy usage.

BRIEF DESCRIPTION OF THE DRAWINGS

FIG. 5 illustrates a flowchart of a third computerized method for battery fault detection according to an example of the present disclosure.

DETAILED DESCRIPTION

Figure 1:
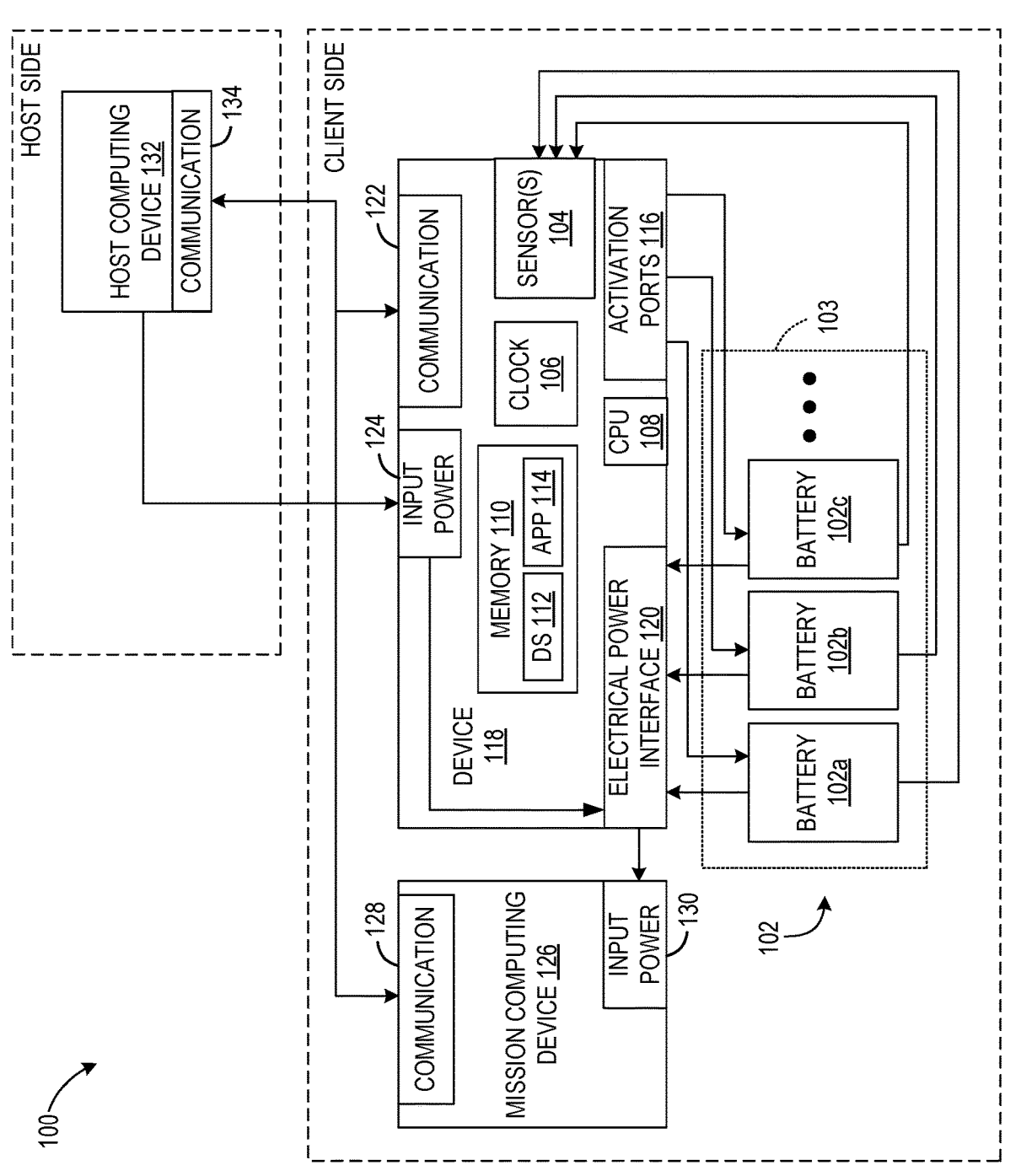
FIG. 1 illustrates a schematic view of a computing system according to an example of the present disclosure.

In view of the above issues, the present disclosure describes systems and methods for managing the energy usage of one or a plurality of thermal batteries to reduce energy consumption, increase energy efficiency, and prolong battery life. Referring to FIG. 1, a battery system 100 comprises one or a plurality of thermal batteries 102, one or a plurality of sensors 104, a clock 106, a processor 108, and a memory 110. The sensors 104 are configured to determine energy parameters at the one or the plurality of thermal batteries 102. The clock 106 is configured to report the time at which the energy parameters are determined.

The memory 110 stores a data structure 112 and executable instructions 114 that, when executed by the processor 108, cause the processor 108 to receive the energy parameters from the sensors 104 and the time from the clock 106. The energy parameters can be received periodically at a predetermined rate, for example. The energy parameters can include at least one energy parameter selected from the group consisting of voltage, current, and temperature of the one or the plurality of thermal batteries 102. The data structure 112 enumerates, in a time series, individual energy parameters determined by the one or the plurality of sensors 104, which can include a voltage sensor, a current sensor, and a temperature sensor. As further discussed below, by sampling the values for the same one or more energy parameters periodically over time following activation, a prediction of the energy discharge and current State of Charge (SOC) or State of Health (SOH) of the thermal batteries 102 can be made.

To this end, based on the received energy parameters, the data structure 112, and the time indicated by the clock 106, the processor 108 calculates a rate of energy usage of the one or the plurality of thermal batteries 102. The rate of energy usage can be stored on the data structure 112 as a plurality of individual data points over time. In other examples, a plurality of rates of energy usage can be calculated for each individual thermal battery among the plurality of thermal batteries 102 stored in a container 103, and the plurality of rates of energy usage can be used to compute a container energy status for the container 103. The container energy status can be embodied in the data structure 112 as temperature and joule counters representing the energy SOC or SOH of the individual thermal batteries 102, such that the energy counter keeps track of how much energy each individual thermal battery 102 has stored, and how much cumulative electrical energy each individual thermal battery 102 has discharged. The battery system 100 can then use the measured energy parameters of the individual thermal batteries 102 to assess the overall SOC or SOH (typically expressed as a percent between 0% (empty) and 100% (full)) of the plurality of thermal batteries 102.

Responsive to calculating the rate of energy usage and determining that a predetermined activation condition has been met, the processor 108 executes battery control commands via activation ports 116 to activate a selected thermal battery or a selected plurality of thermal batteries of the one or the plurality of thermal batteries 102, and/or deactivate or disable a selected thermal battery or a selected plurality of thermal batteries of the one or the plurality of thermal batteries 102. The deactivation control command can electrically disconnect a depleted thermal battery from the battery system 100.

For example, the predetermined activation condition can be a thermal battery temperature falling below a predetermined temperature, a battery current rising beyond a predetermined current threshold, a minimum battery voltage falling below a predetermined minimum voltage threshold, and/or a projection that the rate of energy usage will deplete the remaining energy content of the one or the plurality of thermal batteries 102 within a predetermined time period. In the event of a heavy load condition causing the current to increase beyond the predetermined current threshold and voltage falling below the predetermined minimum voltage threshold, the battery system 100 can detect this predetermined activation condition and activate subsequent batteries among the plurality of thermal batteries 102, deactivate depleted thermal batteries, and/or perform a host of other subroutines that can manage the load of the battery system 100 to reduce energy consumption and provide error notifications.

In some embodiments, the activation commands can be received from an external computer. In the example of FIG. 1, the external computer sending the activation commands can be a mission computing device 126 or a host computing device 132. Alternatively the activation commands can be generated within an energy management device 118 which houses the one or the plurality of sensors 104, the clock 106, the processor 108, the memory 110, and the activation ports 116.

Communication ports 122 can be provided on the energy management device 118 to receive communication from the external computer for maintenance, instruction, or programming, for example. The communication can be received from communication ports 128 of the mission computing device 126 or the communication ports 134 of the host computing device 132.

Although the data structure 112 is stored on the energy management device 118 in the example of FIG. 1, it will be appreciated if the data structure 112 can alternatively be stored on the mission computing device 126. For example, the energy management device 118 can send sensor data from the one or the plurality of sensors 104 to the mission computing device 126 to determine the electrical energy statuses of the thermal batteries 102. The mission computing device 126 can then determine when to activate the next sequential battery based on the determined temperatures and electrical usages of the thermal batteries 102. When the mission computing device 126 is configured to control a weapon system, this can result in a more effective and efficient use of the thermal batteries 102 of the weapon system which can extend an operational range of the weapon system.

In the implementation of FIG. 1, it will be appreciated that the thermal batteries 102a-c are all electrically activated. However, in one alternative implementation, the first thermal battery 102a can be inertially activated by mechanical means, while the subsequent second thermal battery 102b and the third thermal battery 102c are electrically activated. A voltage sensor among the sensors 104 sends a voltage signal indicating a voltage of a first thermal battery 102a among the plurality of thermal batteries 102. A current sensor among the sensors 104 sends a current signal indicating a current of the first thermal battery 102a. A temperature sensor among the sensors 104 sends a temperature signal indicating a temperature of the first thermal battery 102a. The clock 106 sends a time signal indicating a time duration of activation of the first thermal battery 102a, or how long the first thermal battery 102a has been in active operation. The energy management device 118 receives the voltage signal, the current signal, the temperature signal, and the time signal, and responsive to receiving the signals, determines an estimated electrical energy of the first thermal battery 102a based on the current, the voltage, the temperature, and the time duration of the first thermal battery 102a. The energy management device 118 can make this determination at regular time intervals. Upon determining that the estimated electrical energy of the first thermal battery 102a has fallen below a predetermined threshold, the energy management device 118 sends an activation command to the second thermal battery 102b, and deactivates the first thermal battery 102a. Later, when the estimated electrical energy of the second thermal battery 102b has fallen below the predetermined threshold, the energy management device 118 sends an activation command to the third thermal battery 102c, and deactivates the second thermal battery 102b, and so forth.

The energy management device 118 can also be provided with an electrical power interface 120 which provides power to the energy management device 118 and all the components therein by drawing power from the one or the plurality of thermal batteries 102, thereby ensuring that the energy management device 118 remains operational as the one or the plurality of thermal batteries 102 are monitored and controlled. The electrical power interface 120 can also be configured to receive data from the thermal batteries 102, including data indicating the activation or deactivation statuses of individual batteries among the plurality of thermal batteries 102. The electrical power interface 120 can also supply electrical power to the mission computing device 126 by charging the electrical input interface 130 of the mission computing device 126. The electrical power interface 120 can receive electrical power from an electrical input interface 124 which receives electrical charge from the host computing device 132.

The battery system 100 can be configured to power a vehicle. One non-limiting example of the vehicle is that of an aeronautical vehicle such as an aircraft, rocket, missile, helicopter, glider, or unmanned aerial vehicle. Alternatively, the vehicle can be another type of vehicle, such as an automobile, truck, bus, motorcycle, bicycle, etc.

Alternatively, the battery system 100 can be configured to power a weapon system. Non-limiting examples of weapons systems include a missile system, a machine gun system, a cannon system, a rocket system, a bomb system, and an electronic warfare system.

Figure 2:
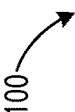
FIG. 2 illustrates an implementation of the computing system of FIG. 1 according to an example of the present disclosure.

Referring to FIG. 2, in one standalone weapon configuration, the mission computing device 126 can be situated on board a military aircraft 136 to control the one or the plurality of thermal batteries 102 that are provided to power a weapon system 138. It will be noted that, in the implementation of FIG. 2, all of the thermal batteries 102 are electrically activated. However, in alternative implementations involving ground-launched applications, the first thermal battery among the thermal batteries 102 can be inertially activated, while the subsequent thermal batteries among the thermal batteries 102 are electrically activated. The host computing device 132 can be a cloud server configured to provide software and firmware updates, navigation data, weather data, and target data to the mission computing device 126 via a wireless network 101, which can be configured as a satellite communication system or an intervehicular communication system, for example. In turn, the mission computing device 126 can send mission data to the host computing device 132, indicating the current status of the weapons that are powered by the one or the plurality of thermal batteries 102. The one or the plurality of thermal batteries 102 can be ignited by an electrical activation pulse by the energy management device 118 directly or indirectly. The mission computing device 126 can execute instructions 114 to detect the energy usage of the one or the plurality of thermal batteries 102 based upon an activation time, voltage, current, and/or energy usage of the one or the plurality of thermal batteries 102. Upon de-tethering from the host computing device 132, the mission computing device 126 can then handle the activation and deactivation of the one or the plurality of thermal batteries 102.

Alternatively, the battery system 100 can operate in the absence of a connection with a host computing device 132. In one standalone weapon configuration, the mission computing device 126 can be configured to control a cannon-fired projectile with one or a plurality of thermal batteries 102, some of which can be inertially activated and others that can be electrically activated. In this configuration, the inertially activated thermal batteries are ignited by mechanical means such that the inertially activated batteries supply electrical power to the energy management device 118. The mission computing device 126 can then execute instructions 114 to detect an energy usage of the one or the plurality of thermal batteries 102 based upon an activation time, voltage, current, and/or energy usage of the one or the plurality of thermal batteries 102.

Figure 3:
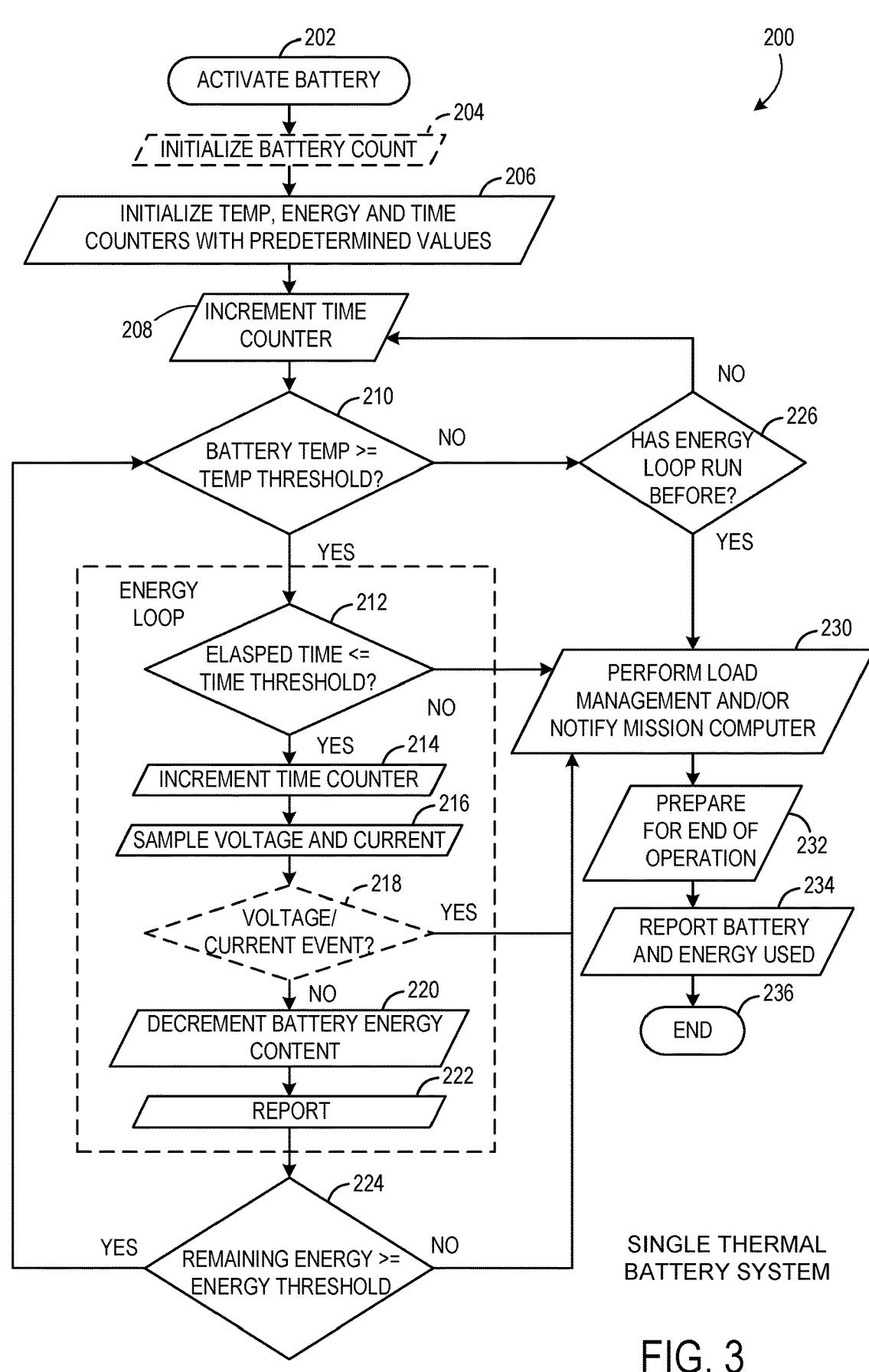
FIG. 3 illustrates a flowchart of a first computerized method according to an example of the present disclosure.

Referring to FIG. 3, a flowchart is illustrated of a first computerized method 200 for the energy management of a single thermal battery. The following description of the first computerized method 200 is provided with reference to the software and hardware components described above and shown in FIGS. 1 and 2. It will be appreciated that the first computerized method 200 also can be performed in other contexts using other suitable hardware and software components. In some examples, the single thermal battery can be a plurality of batteries arranged in parallel, such that the temperature, current, and voltage of one of the plurality of batteries are measured, or the means or medians of the temperatures, currents, and voltages of the plurality of batteries are determined to execute method 200.

At step 202, the single thermal battery is activated, so that the temperature of the thermal battery can rise above a predetermined temperature threshold. At step 204, the battery count is initialized to indicate that one thermal battery is activated in the battery system. At step 206, the energy parameter counters are initialized with predetermined values. The clock starts counting time. The temperature sensor measures an initial temperature of the thermal battery. The initial energy usage is set to zero in the energy counter. The initial known remaining energy content of the thermal battery is entered into the energy counter. At step 208, the time counter is incremented at a predetermined time interval. At step 210, the battery temperature is measured, and it is determined whether the battery temperature is greater than or equal to the predetermined temperature threshold. When it is determined that the battery temperature is greater than or equal to the predetermined temperature threshold, the method 200 proceeds to step 212 in the energy loop. Otherwise, when it is determined that the battery temperature is below the predetermined temperature threshold, the method 200 proceeds to step 226. At step 226, upon determining that the energy loop has not been run yet, the method 200 loops back to step 208 to increment the time counter, and determine again at step 210 whether the battery temperature is greater than or equal to the predetermined temperature threshold.

Starting the energy loop at step 212, it is determined whether or not the time that has elapsed since the thermal battery was activated is less than or equal to a predetermined time threshold. When the elapsed time is less than or equal to the predetermined time threshold, the energy loop proceeds to step 214 to increment the time counter; otherwise the method 200 proceeds to step 230 to perform load management on the battery system and/or notify the mission computing device of the decreased battery temperature. At step 216, the energy parameters are measured, which can include the current and voltage of the thermal battery. At step 218, based on the measured energy parameters, it is determined whether a fault has been detected in the thermal battery. The fault can be detected by determining that the peak current of the thermal battery is greater than or equal to a predetermined current threshold, or by determining that the minimum voltage of the thermal battery is less than or equal to a minimum voltage threshold. Examples of the methods for detecting a fault in the thermal battery are further described below with reference to FIGS. 5 and 6.

Upon detecting the fault, the method 200 proceeds to step 230 to perform load management on the battery system and/or notify the mission computing device of the decreased battery temperature. Otherwise, when no fault has been detected, the energy loop proceeds to step 220 of decrementing the estimated battery energy content, or estimated remaining electrical power in the thermal battery, which is reported at step 222.

For example, load management can be performed on the battery system by causing the mission computing device or the energy management device to deactivate unnecessary features or functions on an electrical device that is powered by the thermal batteries.

After the estimated battery energy content is reported at step 222 of the energy loop, at step 224, it is determined whether the estimated battery energy content is greater than or equal to a predetermined energy content threshold. When it is determined that the estimated battery energy content is greater than or equal to the predetermined energy content threshold, the method 200 proceeds to step 210. Otherwise, the method 200 proceeds to step 230 to perform load management on the battery system and/or notify the mission computing device of the decreased battery temperature. Following step 230, at step 232, the battery system prepares for the thermal battery to be deactivated. At step 234, the battery energy usage is reported, and at step 236, the thermal battery is deactivated.

After the method 200 exits the energy loop, returns to step 210, and proceeds to step 226 when the battery temperature is no longer greater than or equal to the predetermined temperature threshold. At step 226, upon determining that the energy loop has been run before, the method 200 proceeds to step 230 to perform load management on the battery system and/or notify the mission computing device of an incidence of a decreased battery temperature, and then to steps 232, 234, and 236 to deactivate the thermal battery.

Accordingly, method 200 activates a single thermal battery and initializes its energy parameters. The battery temperature is measured and an energy loop is entered when the battery temperature is elevated above a predetermined temperature threshold. The energy loop monitors elapsed time, energy parameters, and remaining battery energy content to detect any faults or insufficient remaining energy content. When a fault is detected or the energy content falls below a predetermined energy content threshold, battery load management is performed and/or the mission computing device is notified. The thermal battery is deactivated appropriately when the battery temperature is considered decreased (below a predetermined threshold) and the thermal battery has been active beyond a predetermined time duration, a fault has been detected in an energy parameter of the thermal battery, or when the battery temperature has already decreased below the predetermined threshold.

It will be appreciated that step 204 of initializing the battery count and step 218 of determining whether a fault has been detected in the thermal battery can be omitted from method 200 in some examples of the present disclosure.

Figure 4:
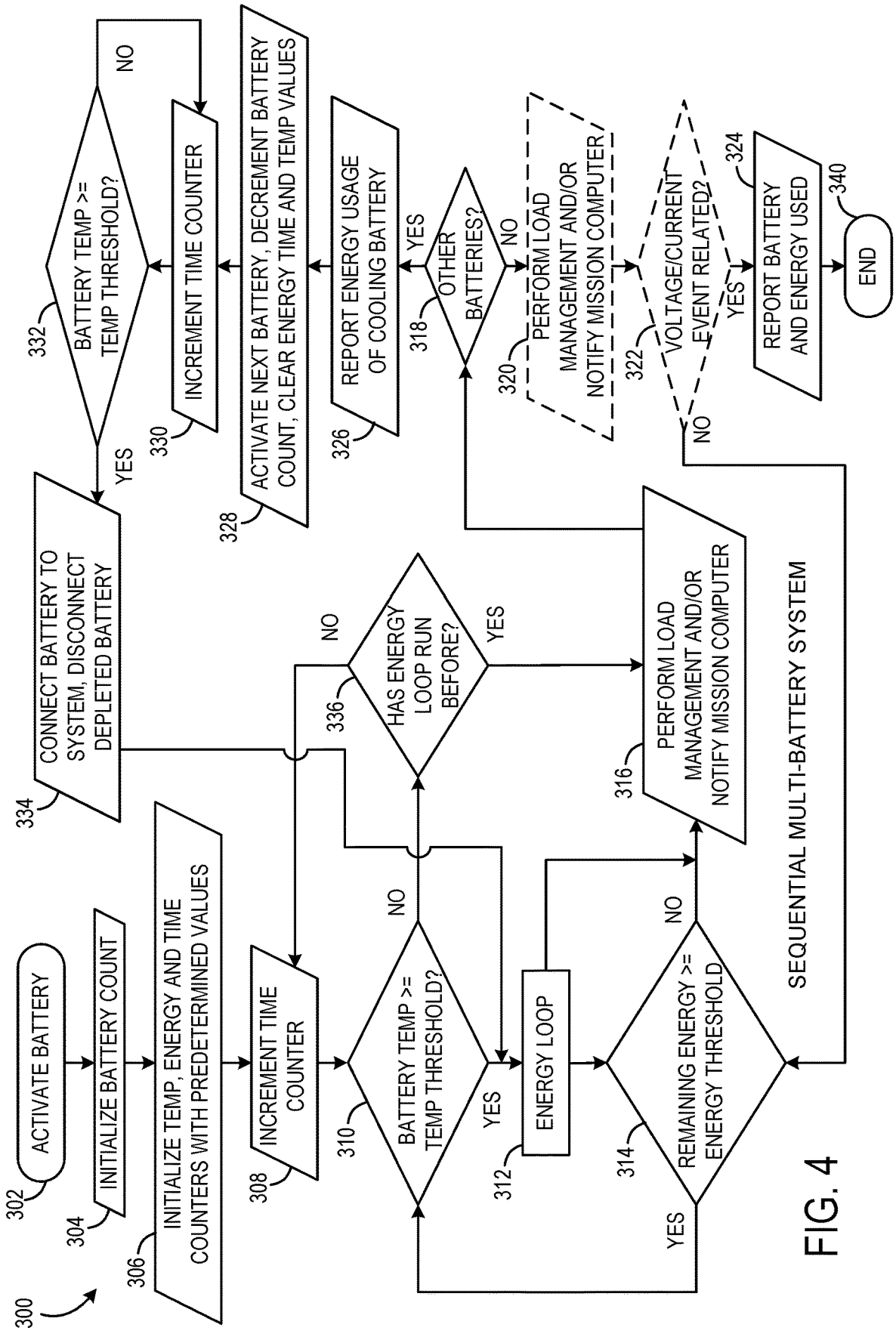
FIG. 4 illustrates a flowchart of a second computerized method according to an example of the present disclosure.

Referring to FIG. 4, a flowchart is illustrated of a second computerized method 300 for the energy management of a plurality of thermal batteries. The following description of the second computerized method 300 is provided with reference to the software and hardware components described above and shown in FIGS. 1 and 2. It will be appreciated that the second computerized method 300 also can be performed in other contexts using other suitable hardware and software components.

At step 302, one of the plurality of thermal batteries is activated, so that the temperature of the one of the plurality of thermal batteries can rise above a predetermined temperature threshold. At step 304, the battery count is initialized to indicate that one thermal battery is activated in the battery system. The battery count can indicate the total quantity of thermal batteries that are available in the battery system. At step 306, the energy parameter counters are initialized with predetermined values. In one example, the clock starts counting time. The temperature sensors measure initial temperatures of each of the plurality of thermal batteries. The initial energy usage is set to zero for the energy counters of each of the plurality of batteries, and the initial known remaining energy contents of each of the plurality of thermal batteries are entered into their respective energy counters. At step 308, the time counter is incremented at a predetermined time interval. At step 310, the battery temperature is measured, and it is determined whether the battery temperature is greater than or equal to the predetermined temperature threshold. When it is determined that the battery temperature is greater than or equal to the predetermined temperature threshold, the method 300 proceeds to step 312, which executes the steps of the energy loop of method 200 described in FIG. 3, including steps 212, 214, 216, 218, 220, and 222. Otherwise, when it is determined that the battery temperature is less than the predetermined temperature threshold, the method 300 proceeds to step 336. At step 336, upon determining that the energy loop has not been run yet, the method 300 loops back to step 308 to increment the time counter, and determine again at step 310 whether the battery temperature is greater than or equal to the predetermined temperature threshold.

As the energy loop of step 312 of method 300 is substantially similar to the energy loop including steps 212, 214, 216, 218, 220, and 222 of method 200, the description thereof is abbreviated for the sake of brevity. When the elapsed time since the activation of the thermal battery is greater than a predetermined time threshold, or a fault has been detected in the thermal battery, the energy loop proceeds to step 316 to perform load management on the battery system and/or notify the mission computing device of the decreased battery temperature. Otherwise, the energy loop proceeds to decrement the estimated battery energy content of the active thermal battery based on the measured energy parameters of the active thermal battery, and proceeds to step 314.

After exiting the energy loop at step 312, it is determined at step 314 whether the estimated battery energy content is greater than or equal to a predetermined energy content threshold. When it is determined that the estimated battery energy content is greater than or equal to the predetermined energy content threshold, the method 300 proceeds to step 310. Otherwise, the method 300 proceeds to step 316 to perform load management on the battery system and/or notify the mission computing device of the decreased battery temperature. Following step 316, at step 318, the battery system checks the battery count to verify whether there are any other thermal batteries left that are available to be activated.

After the method 300 exits the energy loop, returns to step 310, and proceeds to step 336 when the battery temperature is no longer greater than or equal to the predetermined temperature threshold, step 336 is performed to determine whether the energy loop has been run before. At step 336, upon determining that the energy loop has been run before, the method 300 proceeds to step 316 to perform load management on the battery system and/or notify the mission computing device of an incidence of a decreased battery temperature, then continuing to step 318.

At step 318, when it is determined that there are no other thermal batteries to be activated, the method 300 proceeds to step 320 to further perform load management on the battery system and/or notify the mission computing device of the decreased battery temperature. At step 322, it is determined whether a fault has been detected in the thermal battery and/or the estimated battery energy content of the thermal battery has been determined to be less than the predetermined energy content threshold at step 314. The fault can be detected by determining that the peak current of the thermal battery is greater than or equal to a predetermined current threshold, or by determining that the minimum voltage of the thermal battery is less than or equal to a minimum voltage threshold. Examples of the methods for detecting a fault in the thermal battery are further described below with reference to FIGS. 5 and 6. Upon detecting a fault in the thermal battery and/or an estimated battery energy content below the predetermined energy content threshold, at step 324, the energy usage of the thermal battery is reported, and at step 340, the thermal battery with the detected fault and/or depleted energy content is deactivated. Otherwise, at step 322, the method 300 returns to step 314.

At step 318, when it is determined that there are still other thermal batteries left to be activated, the method proceeds to step 326 of reporting the energy usage of the currently connected and active thermal battery. At step 328, the next thermal battery is activated, the battery count is decremented by one, and then the energy parameter counters and time counters are reset or cleared. At step 330, the time counter is incremented. At step 332, it is determined whether the battery temperature of the newly activated thermal battery is greater than or equal to a predetermined temperature threshold. When the battery temperature of the newly activated thermal battery is not yet greater than or equal to the predetermined temperature threshold, the method 300 returns to step 330 to increment the time counter and determine the battery temperature again at step 332 in a loop.

At step 332, when the battery temperature of the newly activated thermal battery is determined to be greater than or equal to the predetermined temperature threshold, then at step 334, the newly activated thermal battery at step 328 is connected to the battery system, and the depleted thermal battery that was determined to be deficient at step 316 is disconnected from the battery system. Then the method 300 returns to the energy loop at step 312.

In accordance with method 300, the battery system activates one thermal battery, initializes the battery count and energy parameters, and measures the battery temperature. When the temperature is greater than or equal to a threshold, the system enters an energy loop which monitors elapsed time, energy parameters, and battery energy content to detect battery faults or insufficient energy in the battery. Load management is performed and the mission computing device is notified when necessary. The system also activates available thermal batteries as needed, deactivating batteries when appropriate. This cycle continues until no more thermal batteries are left to activate, managing the load and reporting energy usage throughout the process.

It will be appreciated that step 320 of performing load management on the battery system and/or notifying the mission computing device of the decreased battery temperature, and step 322 of detecting a fault in the thermal battery can be omitted from method 300 in some examples of the present disclosure.

Referring to FIG. 5, a flowchart is illustrated of a third computerized method 400 for the detection of faults in a thermal battery. Method 400 can be used in step 218 of the energy loop of FIG. 3, step 312 of the energy loop of FIG. 4, or step 322 of FIG. 4. The following description of the third computerized method 400 is provided with reference to the software and hardware components described above and shown in FIGS. 1 and 2. It will be appreciated that the third computerized method 400 also can be performed in other contexts using other suitable hardware and software components.

At step 402, the detection process is started, and the current of the thermal battery is sampled. At step 404, it is determined whether the peak current of the thermal battery is greater than or equal to a predetermined current threshold, which indicates a current excursion. At step 406, responsive to determining the current excursion, the peak current time counter is incremented while the current remains above the predetermined current threshold. At step 408, it is determined whether the time lapsed during the current excursion exceeds a predetermined time threshold. Responsive to determining that the elapsed time has not exceeded the time threshold, at step 418, the current of the thermal battery is sampled with a current sensor, and the method 400 returns to step 404 to determine whether the peak current is greater than or equal to the predetermined current threshold.

At step 404, when it is determined that the peak current of the thermal battery is below the predetermined current threshold, the method 400 proceeds to step 420 to determine whether the minimum voltage of the thermal battery is less than or equal to a minimum voltage threshold, which indicates a voltage excursion. At step 422, responsive to determining the voltage excursion, the voltage time counter is incremented while the minimum voltage remains at or below the voltage threshold. At step 424, it is determined whether the time lapsed during the voltage excursion exceeds a predetermined time threshold. Responsive to determining that the elapsed time has not exceeded the predetermined time threshold, at step 426, the voltage of the thermal battery is sampled with a voltage sensor, and the method 400 returns to step 420 to determine whether the minimum voltage is less than or equal to the minimum voltage threshold.

Responsive to determining that the elapsed time during the current excursion at step 408 or the elapsed time during the voltage excursion at step 424 has exceeded the time threshold, at step 410, the current and voltage measurements are compiled and reported to the mission computing device, at step 412, the voltage time counter and the current time counter are cleared, and at step 414, a fault is detected in the battery to proceed along the YES pathway. In method 200, at step 218, the process will proceed along the YES pathway to step 230 of performing load management and/or notifying the mission computing device of the detected fault. In method 300, at step 322, the process will proceed along the YES pathway to step 324 of reporting the energy usage of the thermal battery.

At step 420, responsive to determining that the minimum voltage of the thermal battery is not less than or equal to the minimum voltage threshold, the method 400 proceeds to step 428 to check whether the voltage time counter or the current time counter has been activated. When it is determined that at least one of the counters has been activated, step 430 is performed to clear the voltage time counter and the current time counter, and the method 400 moves on to step 432. Otherwise, when none of the counters have been activated, step 430 is skipped and the method 400 moves directly to step 432. At step 432, it is determined that a fault has not been detected in the thermal battery. In method 200, at step 218, the process will proceed along the NO pathway to step 220 of decrementing the battery energy content of the thermal battery. In method 300, at step 322, the process will proceed along the NO pathway to step 314 of determining whether the estimated battery energy content is greater than or equal to a predetermined energy content threshold.

In accordance with method 400, faults are detected in a thermal battery by first sampling the current and voltage of the battery and checking whether the peak current or minimum voltage exceed predetermined limits. When these predetermined limits are exceeded, the system increments time counters for either current or voltage excursions. When the elapsed time during these excursions exceeds a predetermined time threshold, the system clears the voltage time counter and the current time counter, and detects a fault in the battery. This information can then be reported to the mission computing device or used for battery load management. When no current excursions or voltage excursions are detected in the battery, the method 400 resets the current time counter and the voltage time counter and determines that no fault is detected in the battery.

Figure 6:
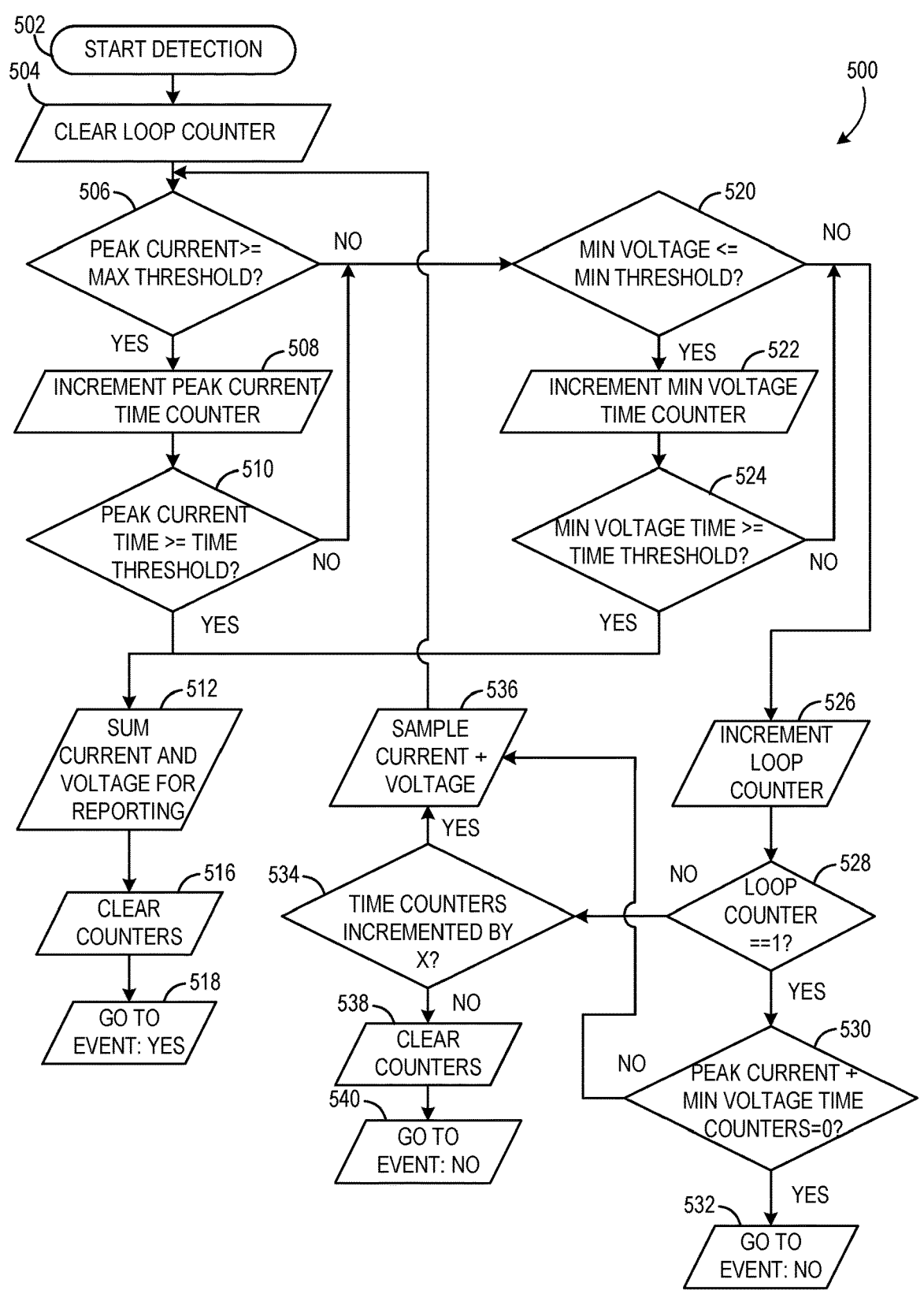
FIG. 6 illustrates a flowchart of a fourth computerized method for battery fault detection according to an example of the present disclosure.

Referring to FIG. 6, a flowchart is illustrated of a fourth computerized method 500 for the detection of faults in a thermal battery. Method 500 can be used in step 218 of the energy loop of FIG. 3, step 312 of the energy loop of FIG. 4, or step 322 of FIG. 4. The following description of the fourth computerized method 500 is provided with reference to the software and hardware components described above and shown in FIGS. 1 and 2. It will be appreciated that the fourth computerized method 500 also can be performed in other contexts using other suitable hardware and software components.

At step 502, the detection process is started, and the current of the thermal battery is sampled. At step 504, the loop counter is cleared. At step 506, it is determined whether the peak current of the thermal battery is greater than or equal to a predetermined current threshold, which indicates a current excursion. At step 508, responsive to determining the current excursion, the peak current time counter is incremented while the current remains above the predetermined current threshold. At step 510, it is determined whether the time lapsed during the current excursion exceeds a predetermined time threshold. Responsive to determining that the elapsed time has not exceeded the predetermined time threshold, the method 500 proceeds to step 520 to determine whether the minimum voltage of the thermal battery is less than or equal to a minimum voltage threshold.

At step 506, when it is determined that the peak current of the thermal battery is below the predetermined current threshold, the method 500 proceeds to step 520 to determine whether the minimum voltage of the thermal battery is less than or equal to a minimum voltage threshold, which indicates a voltage excursion. At step 522, responsive to determining the voltage excursion, the voltage time counter is incremented while the minimum voltage remains less than or equal to the minimum voltage threshold. At step 524, it is determined whether the time lapsed during the voltage excursion exceeds a predetermined time threshold. Responsive to determining that the elapsed time has not exceeded the time threshold, the method 500 proceeds to step 526.

Responsive to determining that the elapsed time during the current excursion at step 510 or the elapsed time during the voltage excursion at step 524 has exceeded the time threshold, at step 512, the current and voltage measurements are compiled and reported to the mission computing device. At step 516, the loop counter, the voltage time counter, and the current time counter are cleared. At step 518, a fault is detected in the battery to proceed along the YES pathway. In method 200, at step 218, the process will proceed along the YES pathway to step 230 of performing load management and/or notifying the mission computing device of the detected fault. In method 300, at step 322, the process will proceed along the YES pathway to step 324 of reporting the energy usage of the thermal battery.

At step 520, responsive to determining that the minimum voltage of the thermal battery is not less than or equal to the minimum voltage threshold, the method 500 proceeds to step 526 to increment the loop counter. At step 528, when the loop counter is one, the method 500 proceeds to step 530 to determine whether the voltage time counter and current time counter are zero. When it is determined that the voltage time counter and/or the current time counter are zero, then at step 532, the process will proceed along the NO pathway.

At step 530, when it is determined that the voltage time counter and current time counter are greater than zero, then at step 536, the current and voltage of the thermal battery are sampled with a current sensor and a voltage sensor, respectively, and the method returns to step 506 to determine whether the peak current of the thermal battery is greater than or equal to the predetermined current threshold.

At step 528, when the loop counter is greater than one, then at step 534, it is determined whether the current time counter and/or the voltage time counter has been incremented by a predetermined number of times, or whether the time lapsed during the current excursion and/or the voltage excursion has exceeded a predetermined time threshold. When it is determined that the current time counter and/or the voltage time counter has been incremented at least by the predetermined number of times, or the time lapsed during the current excursion and/or the voltage excursion has exceeded the predetermined time threshold, at step 536, the current and voltage of the thermal battery are sampled with a current sensor and a voltage sensor, respectively, and the method returns to step 506 to determine whether the peak current of the thermal battery is greater than or equal to the predetermined current threshold. Otherwise, when it is determined that time counter has not been incremented at least by the predetermined number of times, or the time lapsed during the current excursion and/or the voltage excursion has not exceeded the predetermined time threshold, at step 538, the current time counter, the voltage time counter, and the loop counter are cleared, and at step 540, the process will proceed along the NO pathway.

At step 532 and step 540, it is determined that a fault has not been detected in the thermal battery. In method 200, at step 218, the process will proceed along the NO pathway to step 220 of decrementing the battery energy content of the thermal battery. In method 300, at step 322, the process will proceed along the NO pathway to step 314 of determining whether the estimated battery energy content is greater than or equal to a predetermined energy content threshold.

In accordance with method 500, faults are detected in a thermal battery by first sampling the current and voltage of the battery and checking whether the peak current or minimum voltage exceed predetermined limits. When these predetermined limits are exceeded, the system increments time counters for current and/or voltage excursions. When the elapsed time during these excursions exceeds a predetermined time threshold, the system compiles current and voltage measurements, clears the voltage time counter and the current time counter, and detects a fault in the battery. This information can then be reported to the mission computing device or used for battery load management. When no current excursions or voltage excursions are detected in the battery, the method 500 resets the current time counter and the voltage time counter and determines that no fault is detected in the battery.

Although the current is sampled before the voltage is sampled in methods 400 and 500, it will be appreciated that, alternatively, the voltage can be sampled first before the current is sampled.

The above-described system and methods for the energy management of thermal batteries enable real-time monitoring and control of battery energy usage to reduce energy consumption, increase energy efficiency, and prolong battery life. By employing a combination of sensors, a clock, a processor, and a memory storing a data structure enumerating individual energy parameters in a time series, the rate of energy usage of the thermal batteries can be accurately determined and managed, leading to a more efficient and cost-effective operation of thermal batteries in a wide range of applications.

The methods and processes described herein can be tied to a computing system of one or more computing devices. In particular, such methods and processes can be implemented as an executable computer-application program, a network-accessible computing service, an application-programming interface (API), a library, or a combination of the above and/or other compute resources.

Figure 7:
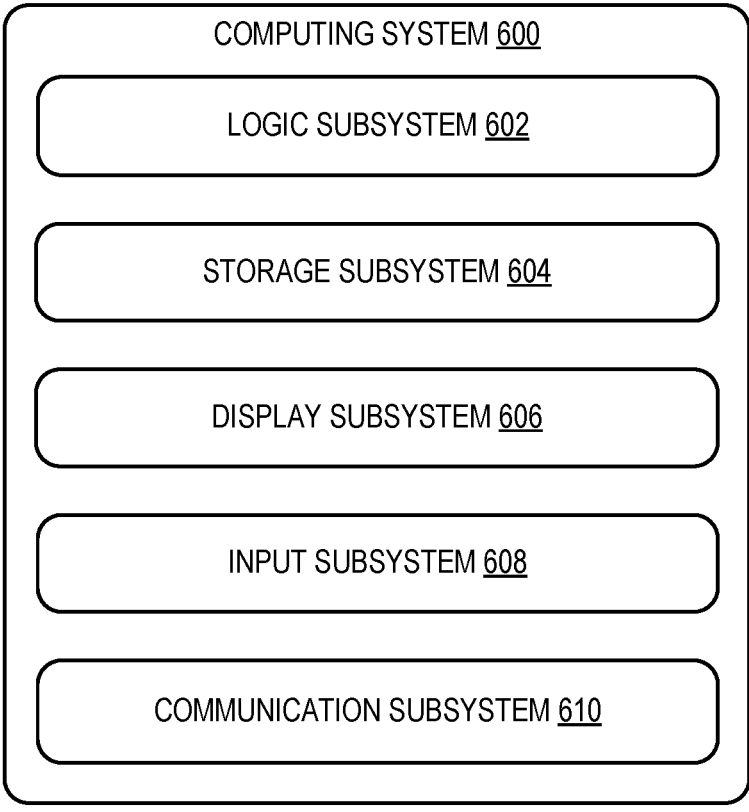
FIG. 7 shows an embodiment of an example computing environment of the present disclosure.

FIG. 7 schematically shows a simplified representation of a computing system 600 configured to provide any to all of the compute functionality described herein. Computing system 600 can take the form of one or more network-accessible devices, server computers, mobile computing devices, Internet of Things (IoT) devices, embedded computing devices, vehicle computing systems, SAR systems, vehicle guidance systems, and/or other computing devices.

Computing system 600 includes a logic subsystem 602 and a storage subsystem 604. Computing system 600 can optionally include a display subsystem 606, input subsystem 608, communication subsystem 610, and/or other subsystems not shown in FIG. 7.

Logic subsystem 602 includes one or more physical devices configured to execute instructions. For example, the logic subsystem can be configured to execute instructions that are part of one or more applications, services, or other logical constructs. The logic subsystem can include one or more hardware processors configured to execute software instructions. Additionally, or alternatively, the logic subsystem can include one or more hardware or firmware devices configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices can be collocated and/or remotely located. Storage subsystem 604 can include volatile, nonvolatile, dynamic, static, read/write, read-only, random-access, sequential-access, location-addressable, file-addressable, and/or content-addressable devices. Storage subsystem 604 can include removable and/or built-in devices. When the logic subsystem executes instructions, the state of storage subsystem 604 can be transformed—e.g., to hold different data.

Aspects of logic subsystem 602 and storage subsystem 604 can be integrated together into one or more hardware-logic components. Such hardware-logic components can include program- and application-specific integrated circuits (PASIC/ASICs), program- and application-specific standard products (PSSP/ASSPs), system-on-a-chip (SOC), and complex programmable logic devices (CPLDs), for example.

The logic subsystem 602 and the storage subsystem 604 can cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine can be instantiated by a single computing device, or a machine can include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality can optionally be saved as one or more unexecuted modules on one or more suitable storage devices.

When included, display subsystem 606 can be used to present a visual representation of data held by storage subsystem 604. This visual representation can take the form of a graphical user interface (GUI). Display subsystem 606 can include one or more display devices utilizing virtually any type of technology. In some implementations, display subsystem can include one or more virtual-, augmented-, or mixed reality displays.

When included, input subsystem 608 can comprise or interface with one or more input devices. An input device can include a sensor device or a user input device. Examples of user input devices include a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 can be configured to communicatively couple computing system 600 with one or more other computing devices. Communication subsystem 610 can include wired and/or wireless communication devices compatible with one or more different communication protocols. The communication subsystem can be configured for communication via personal-, local- and/or wide-area networks.

Further, the disclosure comprises configurations according to the following clauses.

Clause 1. A battery management system comprising: one or a plurality of thermal batteries; one or a plurality of sensors configured to determine energy parameters at the one or the plurality of thermal batteries; a clock configured to report a time at which the energy parameters are determined; a processor; and a memory storing executable instructions that, in response to execution by the processor, cause the processor to: receive the energy parameters from the one or the plurality of sensors; receive the time from the clock; calculate a rate of energy usage of the one or the plurality of thermal batteries based on the energy parameters and the time; and responsive to calculating the rate of energy usage, execute a battery command to activate or disable a selected thermal battery or a selected plurality of thermal batteries of the one or the plurality of thermal batteries based at least in part on the calculated rate of energy usage.

Clause 2. The battery management system of clause 1, wherein the rate of energy usage is stored as a plurality of individual data points over time.

Clause 3. The battery management system of clause 1, wherein the battery command is received from an external computer.

Clause 4. The battery management system of clause 1, wherein the memory stores a data structure which enumerates individual energy parameters determined by the one or the plurality of sensors.

Clause 5. The battery management system of clause 1, wherein the energy parameters include at least one selected from the group consisting of voltage, current, and temperature of the one or the plurality of thermal batteries.

Clause 6. The battery management system of clause 1, wherein the plurality of thermal batteries are stored in a container, and wherein a plurality of rates of energy usage are calculated for each individual thermal battery among the plurality of thermal batteries, and the plurality of rates of energy usage are used to compute a container energy status for the container.

Clause 7. The battery management system of clause 1, wherein the battery commands are executed to activate inactive thermal batteries among the plurality of thermal batteries and electrically disconnect depleted thermal batteries among the plurality of thermal batteries.

Clause 8. The battery management system of clause 1, wherein, responsive to calculating the rate of energy usage and determining that a predetermined activation condition has been met, the battery commands are executed.

Clause 9. The battery management system of clause 8, wherein the predetermined activation condition comprises a thermal battery temperature falling below a predetermined temperature.

Clause 10. The battery management system of clause 8, wherein the predetermined activation condition comprises a projection that the rate of energy usage will deplete a remaining energy content of the one or the plurality of thermal batteries within a predetermined time period.

Clause 11. A battery management method comprising: receiving a voltage signal indicating a voltage of a first thermal battery; receiving a current signal indicating a current of the first thermal battery; receiving a temperature signal indicating a temperature of the first thermal battery; receiving a time signal indicating a time duration of activation of the first thermal battery; determining an estimated electrical energy of the first thermal battery based on the current, the voltage, the temperature, and the time duration of the first thermal battery; determining that the estimated electrical energy of the first thermal battery falls below a predetermined threshold; and activating a second thermal battery via an activation command, responsive to determining that the estimated electrical energy of the first thermal battery falls below the predetermined threshold.

Clause 12. The battery management method of clause 11, wherein the estimated electrical energy is determined based on a rate of energy usage of the first thermal battery.

Clause 13. The battery management method of clause 12, wherein the rate of energy usage is stored as a plurality of individual data points over time.

Clause 14. The battery management method of clause 12, wherein battery commands are executed to electrically disconnect the first thermal battery, when the estimated electrical energy of the first thermal battery falls below the predetermined threshold.

Clause 15. The battery management method of clause 11, further comprising enumerating the voltage, the current, and the temperature of the first thermal battery in a data structure, wherein the estimated electrical energy is determined based on the data structure.

Clause 16. The battery management method of clause 11, wherein, responsive to determining that the estimated electrical energy of the first thermal battery falls below the predetermined threshold and determining that a predetermined activation condition has been met, the second thermal battery is activated via the activation command.

Clause 17. The battery management method of clause 16, wherein the predetermined activation condition comprises a thermal battery temperature falling below a predetermined temperature.

Clause 18. The battery management method of clause 16, wherein the predetermined activation condition comprises a projection that the rate of energy usage will deplete a remaining energy content of the first thermal battery within a predetermined time period.

Clause 19. A battery management system comprising: a first thermal battery; a second thermal battery; a voltage sensor configured to generate a voltage signal indicating a voltage of the first thermal battery; a current sensor configured to generate a current signal indicating a current of the first thermal battery; a temperature sensor configured to generate a temperature signal indicating a temperature of the first thermal battery; a clock configured to generate a time signal indicating a time duration of activation of the first thermal battery; a processor; and a memory storing a data structure and executable instructions that, in response to execution by the processor, cause the processor to: receive the voltage signal indicating the voltage of the first thermal battery; receive the current signal indicating the current of the first thermal battery; receive the temperature signal indicating the temperature of the first thermal battery; receive the time signal indicating the time duration of activation of the first thermal battery; determine an estimated electrical energy of the first thermal battery based on the current, the voltage, the temperature, and the time duration of the first thermal battery; determine that the estimated electrical energy of the first thermal battery falls below a predetermined threshold; and activate the second thermal battery via an activation command, responsive to determining that the estimated electrical energy of the first thermal battery falls below the predetermined threshold.

Clause 20. The battery management system of clause 19, wherein the voltage, the current, and the temperature of the first thermal battery are enumerated in the data structure, wherein the estimated electrical energy is determined based on the data structure; responsive to determining that the estimated electrical energy of the first thermal battery falls below the predetermined threshold and determining that a predetermined activation condition has been met, the second thermal battery is activated via the activation command; and the predetermined activation condition comprises a projection that the estimated electrical energy of the first thermal battery will be depleted within a predetermined time period.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

It will be understood by those of ordinary skill in the art without undue experimentation that the configurations and/or approaches described herein are exemplary in nature, and that these specific implementations or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A battery management system comprising:
one or a plurality of thermal batteries;
one or a plurality of sensors configured to determine energy parameters at the one or the plurality of thermal batteries;
a clock configured to report a time at which the energy parameters are determined;
a processor; and
a memory storing executable instructions that, in response to execution by the processor, cause the processor to:
receive the energy parameters from the one or the plurality of sensors;
receive the time from the clock;
calculate a rate of energy usage of the one or the plurality of thermal batteries based on the energy parameters and the time; and
responsive to calculating the rate of energy usage, execute a battery command to activate or disable a selected thermal battery or a selected plurality of thermal batteries of the one or the plurality of thermal batteries based at least in part on the calculated rate of energy usage.

2. The battery management system of claim 1, wherein the rate of energy usage is stored as a plurality of individual data points over time.

3. The battery management system of claim 1, wherein the battery command is received from an external computer.

4. The battery management system of claim 1, wherein the memory stores a data structure which enumerates individual energy parameters determined by the one or the plurality of sensors.

5. The battery management system of claim 1, wherein the energy parameters include at least one selected from the group consisting of voltage, current, and temperature of the one or the plurality of thermal batteries.

6. The battery management system of claim 1, wherein the plurality of thermal batteries are stored in a container, and wherein a plurality of rates of energy usage are calculated for each individual thermal battery among the plurality of thermal batteries, and the plurality of rates of energy usage are used to compute a container energy status for the container.

7. The battery management system of claim 1, wherein the battery commands are executed to activate inactive thermal batteries among the plurality of thermal batteries and electrically disconnect depleted thermal batteries among the plurality of thermal batteries.

8. The battery management system of claim 1, wherein, responsive to calculating the rate of energy usage and determining that a predetermined activation condition has been met, the battery commands are executed.

9. The battery management system of claim 8, wherein the predetermined activation condition comprises a thermal battery temperature falling below a predetermined temperature.

10. The battery management system of claim 8, wherein the predetermined activation condition comprises a projection that the rate of energy usage will deplete a remaining energy content of the one or the plurality of thermal batteries within a predetermined time period.

11. A battery management method comprising:
receiving a voltage signal indicating a voltage of a first thermal battery;
receiving a current signal indicating a current of the first thermal battery;
receiving a temperature signal indicating a temperature of the first thermal battery;
receiving a time signal indicating a time duration of activation of the first thermal battery;
determining an estimated electrical energy of the first thermal battery based on the current, the voltage, the temperature, and the time duration of the first thermal battery;
determining that the estimated electrical energy of the first thermal battery falls below a predetermined threshold; and
activating a second thermal battery via an activation command, responsive to determining that the estimated electrical energy of the first thermal battery falls below the predetermined threshold.

12. The battery management method of claim 11, wherein the estimated electrical energy is determined based on a rate of energy usage of the first thermal battery.

13. The battery management method of claim 12, wherein the rate of energy usage is stored as a plurality of individual data points over time.

14. The battery management method of claim 12, wherein battery commands are executed to electrically disconnect the first thermal battery, when the estimated electrical energy of the first thermal battery falls below the predetermined threshold.

15. The battery management method of claim 11, further comprising enumerating the voltage, the current, and the temperature of the first thermal battery in a data structure, wherein
the estimated electrical energy is determined based on the data structure.

16. The battery management method of claim 11, wherein, responsive to determining that the estimated electrical energy of the first thermal battery falls below the predetermined threshold and determining that a predetermined activation condition has been met, the second thermal battery is activated via the activation command.

17. The battery management method of claim 16, wherein the predetermined activation condition comprises a thermal battery temperature falling below a predetermined temperature.

18. The battery management method of claim 16, wherein the predetermined activation condition comprises a projection that the rate of energy usage will deplete a remaining energy content of the first thermal battery within a predetermined time period.

19. A battery management system comprising:

a first thermal battery;

a second thermal battery;

a voltage sensor configured to generate a voltage signal indicating a voltage of the first thermal battery;

a current sensor configured to generate a current signal indicating a current of the first thermal battery;

a temperature sensor configured to generate a temperature signal indicating a temperature of the first thermal battery;

a clock configured to generate a time signal indicating a time duration of activation of the first thermal battery;

a processor; and a memory storing a data structure and executable instructions that, in response to execution by the processor, cause the processor to:

receive the voltage signal indicating the voltage of the first thermal battery;

receive the current signal indicating the current of the first thermal battery;

receive the temperature signal indicating the temperature of the first thermal battery;

receive the time signal indicating the time duration of activation of the first thermal battery;

determine an estimated electrical energy of the first thermal battery based on the current, the voltage, the temperature, and the time duration of the first thermal battery;

determine that the estimated electrical energy of the first thermal battery falls below a predetermined threshold; and activate the second thermal battery via an activation command, responsive to determining that the estimated electrical energy of the first thermal battery falls below the predetermined threshold.

20. The battery management system of claim 19, wherein the voltage, the current, and the temperature of the first thermal battery are enumerated in the data structure, wherein the estimated electrical energy is determined based on the data structure;

responsive to determining that the estimated electrical energy of the first thermal battery falls below the predetermined threshold and determining that a predetermined activation condition has been met, the second thermal battery is activated via the activation command; and the predetermined activation condition comprises a projection that the estimated electrical energy of the first thermal battery will be depleted within a predetermined time period.

* * * * *